United States Patent
Duan et al.

(10) Patent No.: US 6,721,697 B1
(45) Date of Patent: Apr. 13, 2004

(54) METHOD AND SYSTEM FOR REDUCING LEXICAL AMBIGUITY

(75) Inventors: Lei Duan, Cupertino, CA (US); Alexander Franz, Palo Alto, CA (US); Keiko Horiguchi, Palo Alto, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/420,517

(22) Filed: Oct. 18, 1999

(51) Int. Cl.$^7$ .................. G06F 17/27; G06F 17/28
(52) U.S. Cl. .................................. 704/9; 704/2
(58) Field of Search .................. 704/1, 9, 10, 270, 704/275; 707/530, 531, 4, 5

(56) References Cited

U.S. PATENT DOCUMENTS

| | | |
|---|---|---|
| 4,974,191 A | 11/1990 | Amirgbodsi et al. ........ 364/900 |
| 5,033,087 A | 7/1991 | Bahl et al. |
| 5,088,038 A | 2/1992 | Tanaka et al. |
| 5,418,717 A | 5/1995 | Su et al. ............... 364/419.08 |
| 5,426,583 A | 6/1995 | Uribe-Echebarria Diaz De Mendiil ......... 364/419.08 |
| 5,510,981 A | 4/1996 | Berger et al. |
| 5,528,491 A * | 6/1996 | Kuno et al. ................... 704/9 |
| 5,535,120 A | 7/1996 | Chong et al. .......... 364/419.03 |
| 5,642,519 A * | 6/1997 | Martin ........................ 704/275 |
| 5,644,775 A | 7/1997 | Thompson et al. |
| 5,659,765 A | 8/1997 | Nii ............................ 395/754 |
| 5,677,835 A | 10/1997 | Carbonell et al. |
| 5,768,603 A | 6/1998 | Brown et al. |
| 5,799,268 A | 8/1998 | Boguraev ...................... 704/9 |
| 5,806,021 A | 9/1998 | Chen et al. .................... 704/9 |
| 5,864,788 A | 1/1999 | Kutsumi ....................... 704/2 |
| 5,873,056 A | 2/1999 | Liddy et al. ................... 704/9 |
| 5,884,247 A | 3/1999 | Christy |
| 5,907,821 A | 5/1999 | Kaji et al. ..................... 704/4 |
| 5,963,894 A | 10/1999 | Richardson et al. .......... 704/9 |
| 5,983,169 A | 11/1999 | Kozma |
| 6,161,083 A | 12/2000 | Franz et al. ................... 704/4 |
| 6,212,500 B1 | 4/2001 | Köhler |
| 6,230,153 B1 | 5/2001 | Howard et al. |
| 6,243,669 B1 | 6/2001 | Horiguchi et al. |
| 6,301,554 B1 | 10/2001 | Christy |
| 6,330,530 B1 | 12/2001 | Horiguchi et al. |

FOREIGN PATENT DOCUMENTS

EP    805 403 A2    5/1997

OTHER PUBLICATIONS

S. Kurohashi, T. Nakamura, Y. Matsumoto, M. Nagao. Improvements of Japanese Morphological Analyzer JUMAN. In: "Proceedings of the International Workshop on Sharable Natural Language Resources", pp. 22–28, Nara, Japan, 1994.

Kenneth W. Church, "A Stochastic Parts Program and Noun Phrase Parser for Unrestricted Text", in Proceedings of the Second Applied Natural Language Processing Conference, Austin, TX, 1988.

(List continued on next page.)

Primary Examiner—Patrick N. Edouard
(74) Attorney, Agent, or Firm—Blakely, Sokoloff, Taylor & Zafman LLP

(57) ABSTRACT

A method and system for reducing lexical ambiguity in an input stream are described. In one embodiment, the input stream is broken into tokens. The tokens are used to create a connection graph comprising a number of paths. Each of the paths is assigned a cost. At least one best path is defined based upon a corresponding cost to generate an output graph. The generated output graph is provided to reduce lexical ambiguity.

27 Claims, 11 Drawing Sheets

OTHER PUBLICATIONS

Edited by Karen Jensen, George E. Heidorn, Stephen D. Richardson, "Natural Language Processing: The PLNLP Approach", Kluwer Academic Publishers, 1993, 22 pages.

Stuart M. Shieber, An Introduction to Unification–based Approaches to Grammar, CSLI, 1986, 23 pages.

M. Tomita, T. Mitamura, H. Musha, M. Kee, "The Generalized LR Parser/Compiler Version 8.1: User's Guide", CMU–CMT–88–MEMO, Apr. 20, 1988, 44 pages.

M. Tomita, K. Knight, "Pseudo–Unification and Full–Unification", CMU, 1987, 10 pages.

M. Ishii, K. Ohta, H. Saito, "An Efficient Parser Generator for Natural Language", COLING 1994, 3 pages.

O. Furuse, H. Iida, "An Example–Based Method for Transfer–Driven Machine Translation", Proceedings of the Conference on Theoretical and Methodological Issues in Machine Translation (TMI–92), 1992, pp. 139–150.

P. Resnik, "Using Information Content to Evaluate Semantic Similarity in a Taxonomy", Proceedings of the International Joint Conference on Artificial Intelligence (IJCAI–95), 1995.

T. C. Bell, J. G. Cleary, I. H. Witten, "Text Compression", Prentice Hall, 1990, 19 pages.

H. Maruyama, H. Watanabe, "Tree Cover Search Algorithm for Example–Based Translation", in Proceedings of the Fourth International Conference on Theoretical and Methodological Issues in Machine Translation (TMI–92), 1992, pp. 173–184.

PCT Search Report dated Jan. 29, 2001, 6 pages.
PCT Search Report dated Jan. 31, 2001, 5 pages.
PCT Search Report dated Apr. 4, 2001, 4 pages.
PCT Search Report dated Feb. 22, 2001, 5 pages.

\* cited by examiner

I - pronoun;
want - verb, noun;
to - particle;
visit - noun, verb;
the - determiner;
White - adjective;
House - verb, noun;
White House - proper noun.

METHOD AND SYSTEM FOR REDUCING LEXICAL AMBIGUITY

BACKGROUND OF THE INVENTION

1. Field of the Invention

The present invention relates to language translation systems. More particularly, the present invention relates to a method for reducing lexical ambiguity.

2. Background Information

With the continuing growth of multinational business dealings where the global economy brings together business people of all nationalities and with the ease and frequency of today's travel between countries, the demand for a machine-aided interpersonal communication system that provides accurate near real-time language translation, whether in spoken or written form, is a compelling need. This system would relieve users of the need to possess specialized linguistic or translational knowledge.

A typical language translation system functions by using natural language processing. Natural language processing is generally concerned with the attempt to recognize a large pattern or sentence by decomposing it into small subpatterns according to linguistic rules. A natural language processing system uses considerable knowledge about the structure of the language, including what the words are, how words combine to form sentences, what the words mean, and how word meanings contribute to sentence meanings. However, linguistic behavior cannot be completely accounted for without also taking into account another aspect of what makes humans intelligent—their general world knowledge and their reasoning abilities. For example, to answer questions, to participate in a conversation, or to create and understand written language, a person not only must have knowledge about the structure of the language being used, but also must know about the world in general and the conversational setting in particular. Specifically, phonetic and phonological knowledge concerns how words are related to sounds that realize them. Morphological knowledge concerns how words are constructed from more basic units called morphemes. Syntactic knowledge concerns how words can be put together to form correct sentences and determines what structural role each word plays in the sentence and what phrases are subparts of what other phrases. Typical syntactic representations of language are based on the notion of context-free grammars, which represent sentence structure in terms of what phrases are subparts of other phrases. This syntactic information is often presented in a tree form. Semantic knowledge concerns what words mean and how these meanings combine in sentences to form sentence meanings. This is the study of context-independent meaning—the meaning a sentence has regardless of the context in which it is used. The representation of the context-independent meaning of a sentence is called its logical form. The logical form encodes possible word senses and identifies the semantic relationships between the words and phrases.

Natural language processing systems further include interpretation processes that map from one representation to the other. For instance, the process that maps a sentence to its syntactic structure and logical form is called parsing, and it is performed by a component called a parser. The parser uses knowledge about word and word meaning, the lexicon, and a set of rules defining the legal structures, the grammar, in order to assign a syntactic structure and a logical form to an input sentence.

Formally, a context-free grammar of a language is a four-tuple comprising nonterminal vocabularies, terminal vocabularies, a finite set of production rules, and a starting symbol for all productions. The nonterminal and terminal vocabularies are disjoint. The set of terminal symbols is called the vocabulary of the language. Pragmatic knowledge concerns how sentences are used in different situations and how use affects the interpretation of the sentence.

A natural language processor receives an input sentence, lexically separates the words in the sentence, syntactically determines the types of words, semantically understands the words, pragmatically determines the type of response to generate, and generates the response. The natural language processor employs many types of knowledge and stores different types of knowledge in different knowledge structures that separate the knowledge into organized types.

The complexity of the natural language process is increased due to lexical ambiguity of input sentences. Cases of lexical ambiguity may hinge on the fact that a particularly word has more than one meaning. For example, the word bank can be used to denote either a place where monetary exchange and handling takes place or the land close river, the bank of the river. A word or a small group of words may also have two or more related meanings. That is, the adjective bright may be used as a synonym for "shining" (e.g., "The stars are bright tonight") or as a synonym for "smart" (e.g., "She must be very bright if she made an "A" on the test"). In the field of spoken language translation, the problem is compounded by words that are not necessarily spelled the same but are pronounced the same and have different meanings. For example, the words night and knight are pronounced exactly the same although they are spelled differently, and they have very different meanings.

Factors causing the lexical ambiguity vary from one language to another. In character-based languages, e.g. in the Japanese language, extracting information from an input sentence creates a serious problem because Japanese sentences do not have spaces between words. Part-of-speech (POS) tags are another factor causing lexical ambiguity. In many languages, including both word-based and character-based natural languages, one word may have more than one POS tag depending on the context of POS within the sentence. The word table, for example, can be a verb in some contexts (e.g., "He will table the motion") and a noun in others (e.g., "The table is ready"). The existence of multi-word expressions in many languages, including the English language, is yet another factor contributing to lexical ambiguity. That is, depending on the context, a group of words, such as "white house", can be treated as a multiword expression (e.g., "I want to visit the White House") or as separate words (e.g., "He lives in a white house across the street").

One current approach that deals with lexical ambiguity in a Japanese input sentence involves treating each Japanese character as a word and letting the parser group the characters using the parsing grammar. After the parser defines the words, the parser must try all POS tags found for each word and rule out the impossible tags. As a result, the parsing program is time consuming and requires a large amount of space for its operation. If a long or complicated sentence is involved, such a parser may not be able to perform the parsing at all.

Another current approach to deal with lexical ambiguity recognizes all the possible words in a Japanese sentence and then finds possible connections between adjacent words. The recognition of all the words is done using a morpheme dictionary. The morpheme dictionary defines Japanese morphemes with the names of POS tags. The connectivity is defined using a connection-pair grammar. The connection-pair grammar defines pairs of sets of morphemes that may occur adjacently in a sentence. Various costs are then applied to the morphemes to compare all possible segmentations of the input sentence. These various costs correspond to the likelihood of observing a word as a certain part of speech and to the likelihood of observing two words in adjacent positions. In this approach, the segmentation that has the lowest corresponding cost is selected from all the possible segmentations of the input sentence for further processing. However, the segmentation selected based upon the lowest costs may not correspond to the correct meaning of the input sentence. Since the syntactic parser is better equipped to recognize the correct meaning of the input sentence, making a selection before the parsing operation may result in loss of pertinent information. Consequently, this approach may lead to inaccurate results in producing a response to an input sentence; especially in producing a response to a longer or more complicated sentence. The techniques currently used to deal with lexical ambiguity in an English sentence have problems similar to those identified above. Unlike Japanese sentences, English sentences do not need to be segmented as the individual words form the segments. However, multiple POS tags of a word present the same problem for English sentences as they do for Japanese sentences. As described above, one approach taken to deal with this problem requires the parser to try all POS tags found for each word and rule out the impossible tags. In this approach, the parsing program is very time consuming and requires a large amount of space for its operation. In addition, this approach may not be able to handle long and complicated sentences.

Another approach analyzes all POS tags for each word in an English input sentence and finds the most likely POS tag for each word using lexical and statistical probabilities. However, some probabilities may be hard to estimate. No matter how much text is analyzed for the estimation, there will always be a large volume of words that appear only a few times. Thus, relying strictly on probabilities may not result in an accurate interpretation, especially in dealing with a long or complex sentence in which a word's meaning is dependent upon the context of the word within the sentence. As explained earlier, since the syntactic parser is better equipped to recognize the correct meaning of the input sentence, making a selection before the parsing operation may result in loss of pertinent information.

Therefore, what is required is an efficient way of reducing lexical ambiguity which will provide an accurate interpretation of an input sentence without unreasonably burdening the operation of the syntactic parser.

SUMMARY OF THE INVENTION

A method and system for reducing lexical ambiguity in an input stream are described. In one embodiment, the input stream is broken into tokens. The tokens are used to create a connection graph comprising a number of paths. Each of the paths is assigned a cost. At least one best path is defined based upon a corresponding cost to generate an output graph. The generated output graph is provided to reduce lexical ambiguity.

BRIEF DESCRIPTION OF THE DRAWINGS

The present invention is illustrated by way of example and may be better understood by referring to the following description in conjunction with the accompanying drawings, in which like references indicate similar elements and in which:

FIGS. 2b, 2c, and 2d are exemplary diagrams of structures used by the natural language translation system of FIG. 2a;

DETAILED DESCRIPTION OF AN EMBODIMENT OF THE PRESENT INVENTION

Figure 1:
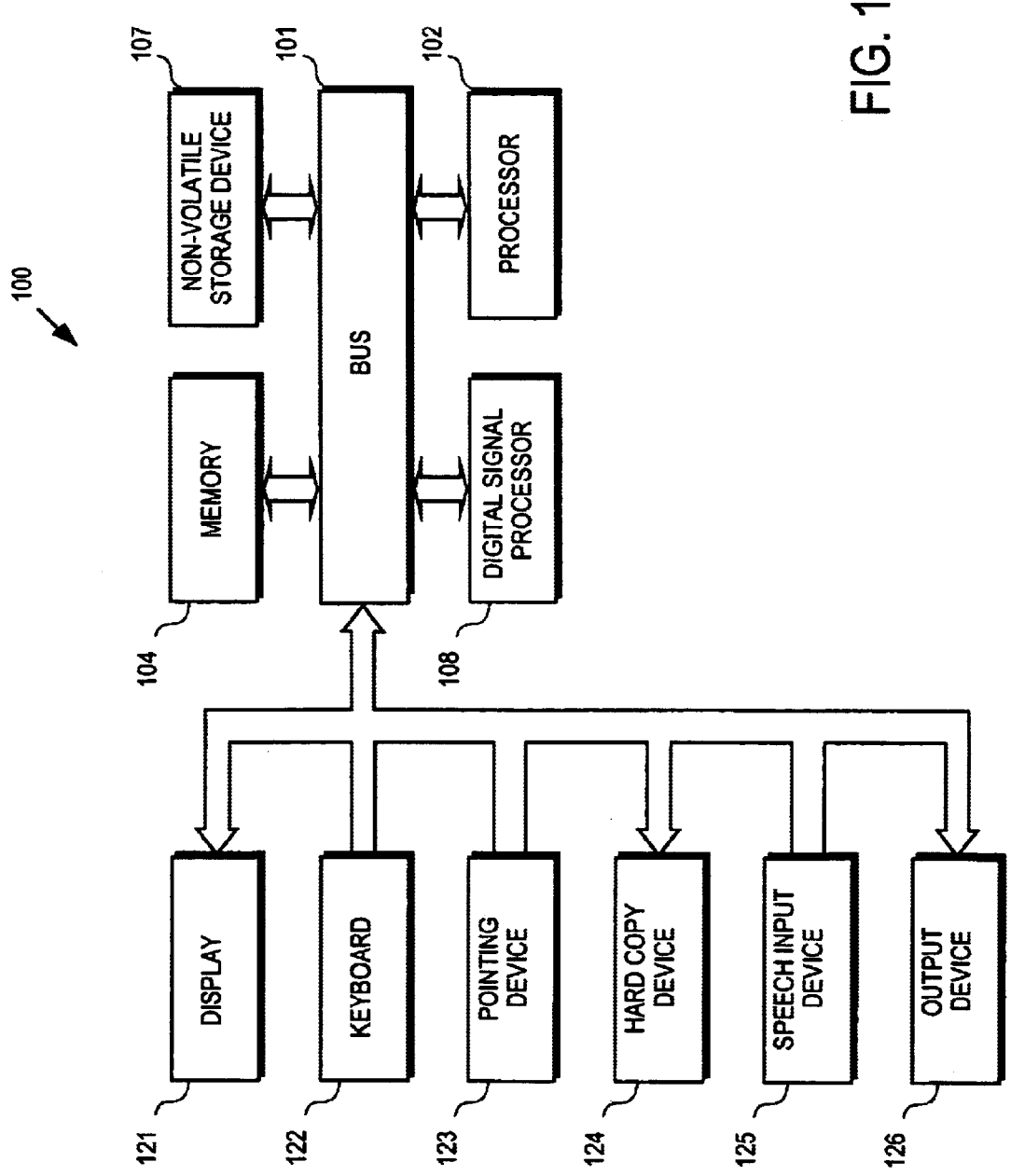
FIG. 1 is a block diagram of one embodiment for an architecture of a computer system.

A method and system for reducing lexical ambiguity in an input stream are described. In one embodiment, the input stream is broken into tokens. The tokens are used to create a connection graph comprising a number of paths. Each of the paths is assigned a cost. At least one best path is defined based upon a corresponding cost to generate an output graph. The generated output graph is provided to reduce lexical ambiguity.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Lexical ambiguity is a recognized problem in natural language processing. The problem with lexical ambiguity arises when a natural language processor needs to extract information from an input sentence for the subsequent syntactic parsing. Extracting information becomes problematic in character-based languages which do not have separators such as spaces between words in a sentence. In addition, in many languages, a word may have different part of speech (POS) tags depending on the context of the POS within the sentence. In some languages, certain groups of words can either be treated as multiword expressions or as separate words depending on the context. In one embodiment, the lexical ambiguity reduction module provides a method for reducing lexical ambiguity in an input sentence which increases the segmentation of the input sentence and supports POS tagging and multiword processing. In this embodiment, the lexical ambiguity module provides a graph which is passed to a syntactic analysis module for subsequent processing. In one embodiment, an efficient method of reducing lexical ambiguity is provided which allows the language processing system to produce an accurate interpretation of the input sentence without unreasonably burdening the operation of the syntactic analysis module.

FIG. 1 is a block diagram of one embodiment for an architecture of a computer system 100. Referring to FIG. 1, computer system 100 includes system bus 101 that allows for communication among processor 102, digital signal processor 108, memory 104, and non-volatile storage device 107. System bus 101 may also receive inputs from keyboard 122, pointing device 123, and speech signal input device 125. System bus 101 provides outputs to display device 121, hard copy device 124, and output device 126 (such as, for example, an audio speaker). Memory 104 may include, for example, read only memory (ROM), random access memory (RAM), flash memory, or any combination of the above.

It will be appreciated that computer system 100 may be controlled by operating system software which includes a file management system, such as, for example, a disk operating system, which is part of the operating system software. The file management system may be stored in non-volatile storage device 107 and may be configured to cause processor 102 to execute the various functions required by the operating system to input and output data and to store data in memory 104 and on non-volatile storage device 107.

Figure 2A:
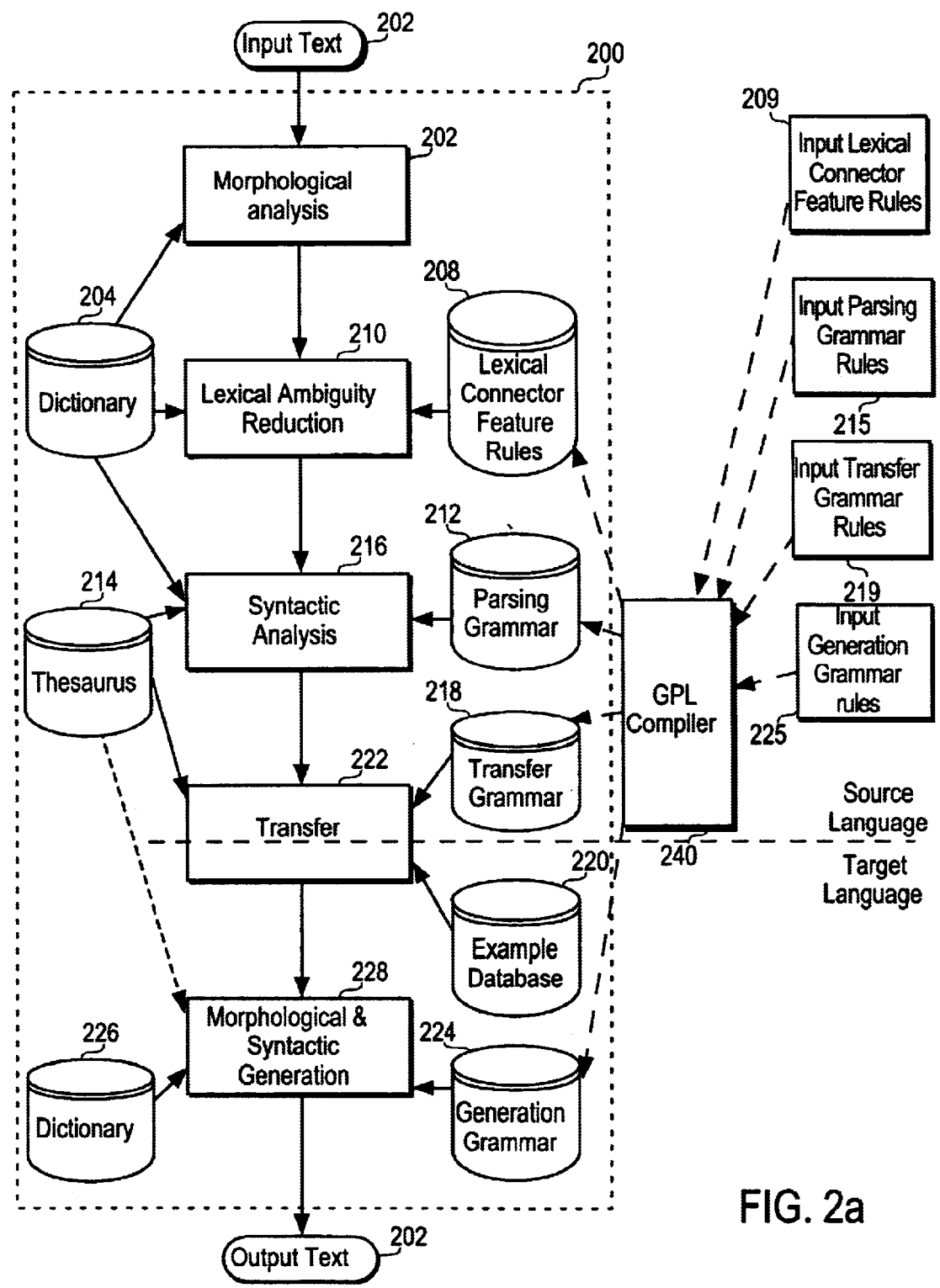
FIG. 2a is a block diagram of one embodiment for a natural language translation system.

FIG. 2a is a block diagram of one embodiment for a natural language translation system 200. Referring to FIG. 2a, natural language translation system 200 includes five modules, supporting databases, and associated grammars to quickly and accurately translate text between source and target languages. Input text may be directly input into natural language translation system 200 (for example, as with a person typing sentences into a computer using keyboard 122). Alternatively, input text to natural language translation system 200 may be the output of another system, such as, for example, output from a speech recognition system (for example, speech input device 125), or from an optical character recognition system (not shown).

An English sentence "He wants to go to the White House" is used throughout this section as example text input to describe the functioning of the system 200. The individual units in a sentence are referred to herein as "words" but the natural language translation system 200 is not limited to only word-based natural languages, having equal applicability to translation of character-based languages as well. Except where the differences in processing word-based and character-based languages are specified, the term "word" is intended to encompass both words and characters.

In the following description, a grammar is generally a set of context-free rules that define the valid phrase structures in the source or target language, with each context-free rule associated with one or more statements (the "rule body") that perform tests and manipulations on the linguistic representations (feature structures). Thus, an English sentence may be combined from a noun phase (NP) and a verb phrase (VP), but the subject and verb forms must agree, e.g., "He want to go to the White House" is a valid phrase structure but an improper English sentence. All rule bodies utilized by the grammars of language translation system 200 are in the form of computer-executable routines produced by defining the grammar in terms of a grammar programming language (GPL) and passing appropriate rule bodies (209, 215, 219, and 225) through a GPL compiler 240. The output of the GPL compiler 240 may be in the form of directly executable code, or may be in the form of standard computer programming language statements (such as, for example, C, C++, Pascal, or Lisp) which are then input into the corresponding programming language compiler to produce executable code. In either case, the compiled grammars include a specific function for each context-free rule. The specific function performs all the processing required by the rule and its associated rule body. Furthermore, the interfaces between the compiled grammars and the modules enable a single language translation system 200 to perform translation between multiple natural languages, and to perform more than one translation simultaneously.

A morphological analysis module 206 takes text input 202 and uses a source language dictionary 204 to decompose the words into morphemes by identifying root forms, grammatical categories, thesaurus information, and other lexical features of the words. The morphological analysis module 206 builds a "feature structure" for each word. Feature structures are well known in the art as linguistic data structures that contain feature-value pairs for strings, symbols, and numbers that appear in a natural language sentence. Each feature of a word is mapped to the appropriate value through a function commonly designated as:

word ↦ [feature: value]

Thus, a simplified, exemplary representation of the feature structures for the words "he" and "wants" are as follows:

$$\text{(Feature Structure 1)} \quad I \mapsto \begin{bmatrix} \text{root: he} \\ \text{cat: pronoun} \end{bmatrix}$$

$$\text{(Feature Structure 2)} \quad \text{wants} \mapsto \begin{bmatrix} \begin{bmatrix} \text{root: want} \\ \text{cat: noun} \end{bmatrix} \\ \text{OR} \\ \begin{bmatrix} \text{root: want} \\ \text{cat: verb} \end{bmatrix} \end{bmatrix}$$

The Feature Structure 2 may be referred to as a "disjunctive" feature structure as it represents two mutually exclusive feature structures that are valid for the word. It will be appreciated that the grammatical category is not the only feature of these two words and that morphological analysis module 206 outputs full feature structures. The example feature structures are simplified for the sake of clarity in explanation and are also frequently represented by a shorthand notation, e.g., [want] or NP[ ].

The feature structures built by morphological analysis module 206 are input into lexical ambiguity reduction module 210. In one embodiment, lexical ambiguity reduction module 210 may segment the words in character-based languages that do not utilize spaces through a database of lexical connector feature rules 208. Lexical connector feature rules 208 are created from GPL grammar statements as described above. Each possible combination of adjacent segmented words are assigned a lexical cost. Dictionary 204 defines combinations of words ("multiwords"). Lexical ambiguity reduction module 210 evaluates each feature structures that contains a part-of-speech (POS) ambiguity, such as the feature structure for the word "wants" which is tagged as both a noun and a verb. The various possible POS tags are assigned a lexical cost. Lexical ambiguity reduction module 210 weighs the cost assigned to each word in the sentence and selects those feature structures that have the lowest cost.

Figure 2B:
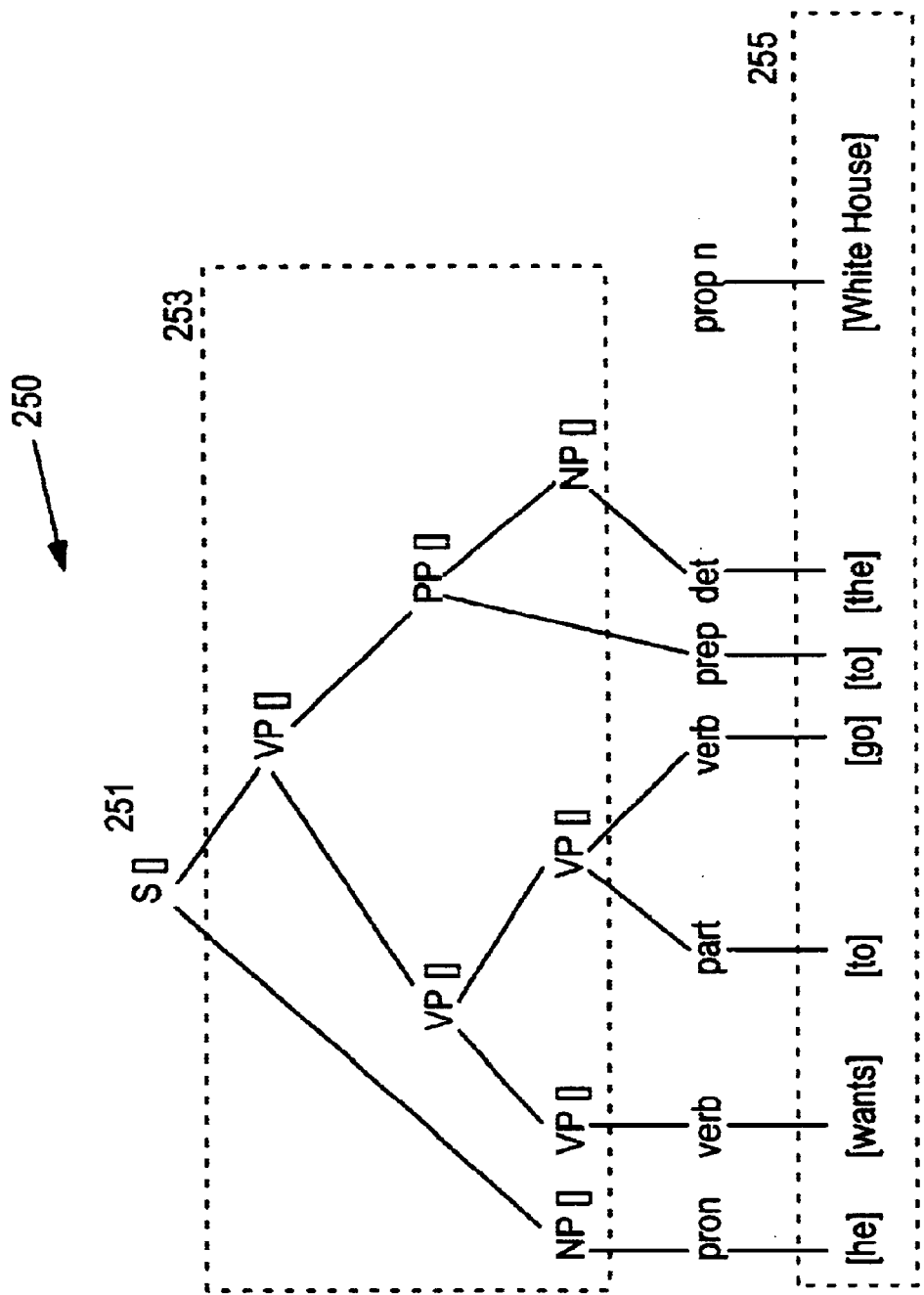

The feature structures chosen for the words by lexical ambiguity reduction module 210 are passed to syntactic analysis module 216. Syntactic analysis module 216 combines the chosen feature structures into a feature structure that represents the content of the input sentence. In one embodiment, syntactic analysis module 216 uses parsing grammar 212 to create a syntax parse tree for the sentence. Parsing grammar 212 contains the source language context-free grammar rules in the form of a parsing table and the associated rule bodies in executable code. Each leaf of the syntax parse tree is a feature structure for one of the words in the sentence. Once the leaves are created, an intermediate feature structure for each branch (parent) node in the syntax parse tree is built by combining its child nodes as specified in one or more of the context-free grammar rules. The rule body for each potentially applicable context-free grammar rule manipulates the various feature structures at the child nodes and determines whether the associated context-free rule could create a valid phrase from the possible combinations. A rule body may cause a thesaurus 214 to be queried as part of the manipulation. It will be appreciated that the feature structure that results from applying the context-free grammar rules may be nested (i.e., contain multiple feature structures from each child node). Syntactic analysis module 216 may create the syntax parse tree shown in FIG. 2b for the example sentence from its constituent feature structures, with the following feature structure at the top (root) of the syntax parse tree to represent the full sentence:

$$\text{(Feature Structure 3)} \quad S \mapsto \begin{bmatrix} \text{SUBJ "he"} \\ \text{VERB "wants to go"} \\ \text{OBJ "to the White House"} \end{bmatrix}$$

It will be appreciated that both the syntax parse tree 250 and the Feature Structure 3 are not exact representations but are simplified for purposes of ease in explanation.

The feature structure for the sentence in the source language is passed to transfer module 222. The feature structure represents the analysis of the source input and may contain a number of nested linguistic representations (referred herein as sub-structures or slots). Transfer module 222 uses transfer grammar 218 to match source language slots of the input with source language slots in example database 220. Example database 220 contains feature structure pairs in the source language and a target language. For example, database 220 may contain matching feature structures in English and Japanese. Transfer grammar 218 consists of a set of rewrite rules with a context-free component and a GPL rule body. The context-free parts of the rules are used to create a transfer generation tree.

Figure 2C:
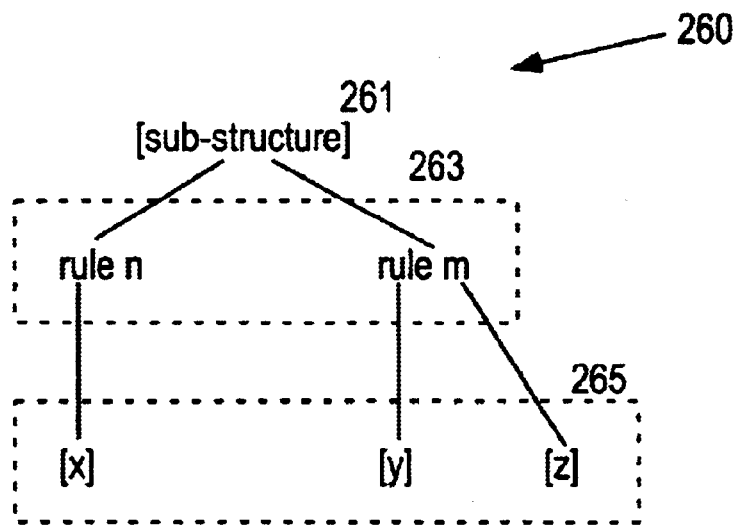

Transfer module 222 uses the GPL rule bodies within transfer grammar 218 to match the input source sub-structures or slots to the source sub-structures or slots in example database 220. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2c is used to break the sub-structure into multiple sub-structures. The new input may be a part of the original, source feature structure or a new feature sub-structure that is constructed from sections of different slots.

Transfer module 222 uses the input feature structure (or sub-structure) in the source language as the starting symbol to build transfer generation tree 260. Root 261 is a symbol-node (s-node) and is labeled with the starting symbol of the feature structure. The transfer grammar determines which transfer grammar rules are applicable to the feature structure at the root 261, and creates child rule-node(s) (r-node) 263 depending from root 261. In one embodiment, r-nodes 263 are the rule numbers within transfer grammar 218 that may be validly applied to the input feature structure. Transfer grammar 218 rules added to tree 260 are applied to the s-nodes 265. If the application of each rule succeeds, a child rule-node (r-node) 265 is added to tree 260. If the application fails, the s-node 261 is tagged as "dead" for sub-sequent removal. Transfer grammar 218 then creates a new s-node 265 for each r-node 263. Again, the applicable rules are found for each s-node 265 and applied. The process is repeated until all sub-features within the feature structure have been expanded. Transfer generation tree 260 is then pruned to remove any "dead" nodes and corresponding sub-trees. If root 261 is tagged as "dead," the generation fails. Otherwise, the resulting transfer generation tree 260 is used by transfer module 222 to match the feature structure against the example database 220. The feature structures and sub-structures in the target language associated with a match are substituted for the corresponding feature structures and sub-structures matched in the source language. Transfer module 222 recursively applies the transfer rules contained within transfer grammar 218 from the top-most transfer rules until all meaningful sub-features or constituents within the input source feature structure are transferred to the target sub-structures. The transfer module 222 will consult the thesaurus 214 when required to do so by a transfer rule. Transfer module 222 outputs a feature structure in the target language.

Figure 2D:
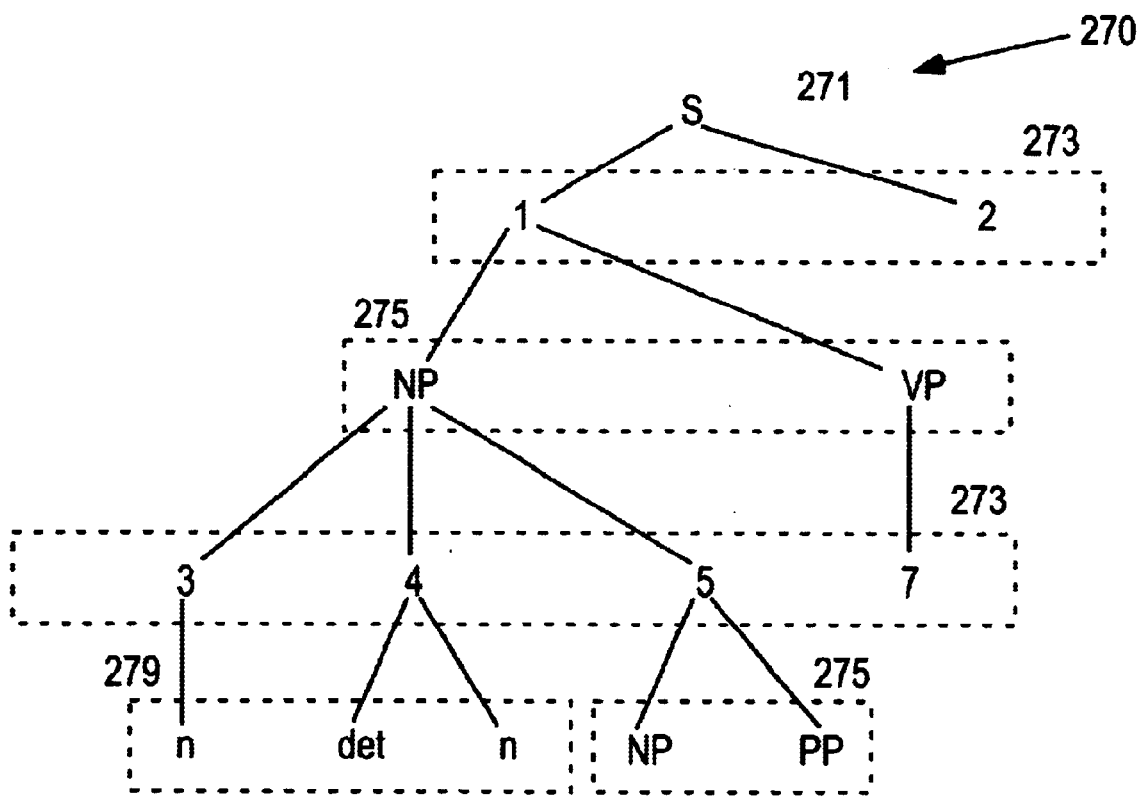

The feature structure for the sentence in the target language is passed to a morphological and syntactical generation module 228, where it is used as the root node for a syntactical generation tree, an example of which is shown in FIG. 2d. The syntactical generation tree is built in the same fashion as the transfer generation tree, with context-free rules in a generation grammar 224 as its r-nodes 273. The generation grammar 224 copies information to each s-node 275, 279. Unlike the transfer module 226, in which multiple sub-transfers created multiple transfer generation trees, only one syntactical generation tree is created by the morphological and syntactical generation module 228. Any s-node that is not a leaf node 279, i.e., associated with a feature structure for a word, is used to generate the next level of r-nodes. When all child s-nodes under an r-node are leaf nodes, the current branch of the tree is complete and the morphological and syntactical generation module 228 traverses back up the tree to find the next s-node that is not a leaf node. The thesaurus 214 is consulted when necessary during the generation of the tree. The transfer generation tree is complete when all the lowest level s-node are leaf nodes.

When the syntactical generation tree is complete, the leaf nodes contain output feature structures representing the words in one or more translations of the input sentence. The sequence of output feature structures that represents the best sentence is converted into output text 230 by the morphological and syntactical generation module 228 using the dictionary 226. Alternatively, all output feature structures for all sentences may be converted into the output text 230.

Figure 3:
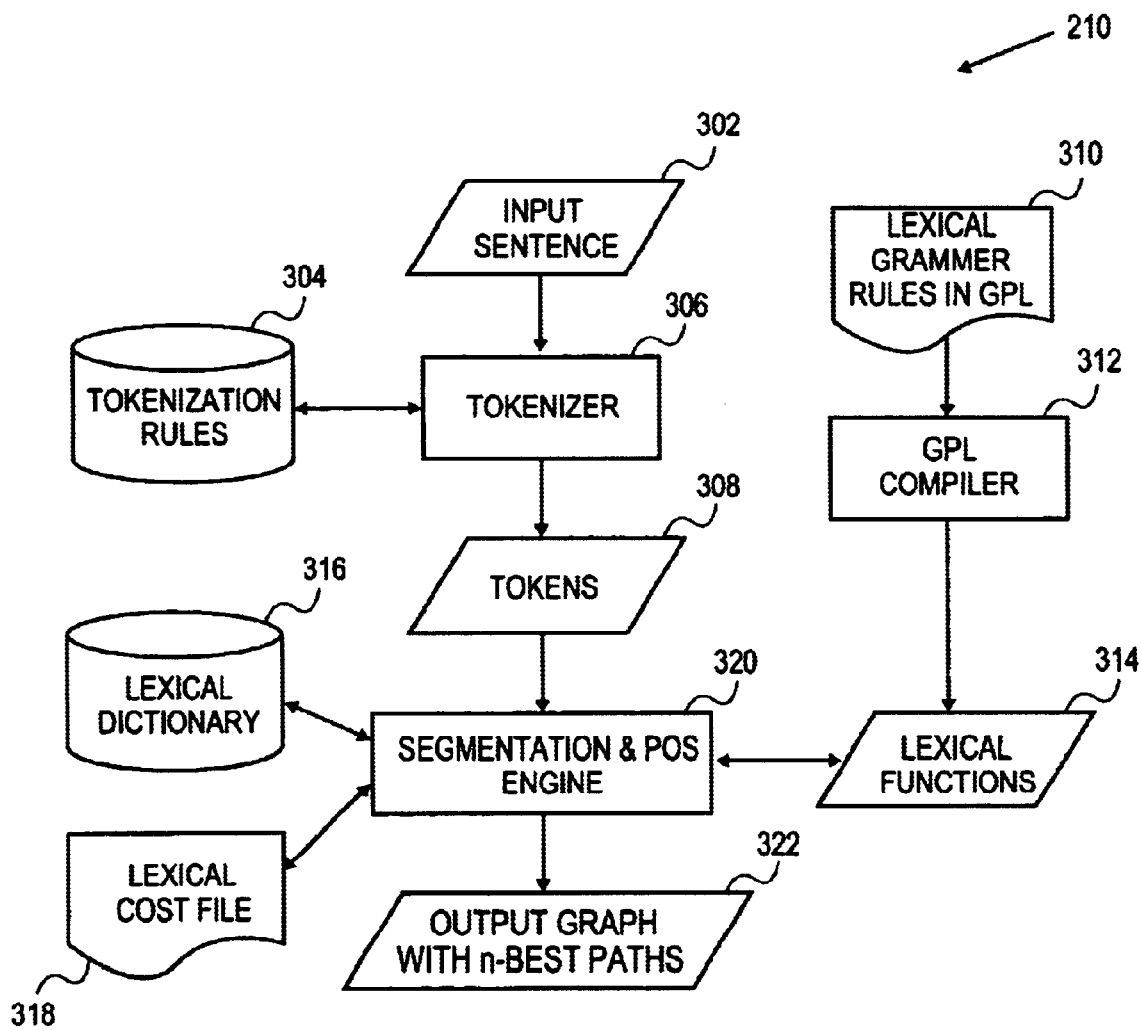
FIG. 3 is a diagram of one embodiment for a lexical ambiguity module.

Lexical ambiguity reduction module 210 of FIG. 2A will now be described in more detail. FIG. 3 is a diagram of one embodiment for lexical ambiguity reduction module 210 of FIG. 2a. Referring to FIG. 3, lexical ambiguity reduction module 210 comprises tokenizer 306, segmentation and POS engine 320 and grammar programming language (GPL) compiler 312. It will be recognized by one skilled in the art that a wide variety of other engines other than that discussed above may be used by the lexical ambiguity reduction module 300 without loss of generality.

In one embodiment, tokenizer 306 receives input string 302 comprising a sequence of words and breaks it into individual tokens 308. A token may comprise, for example, a full word, a reduced word, a number, a symbol, or a punctuation character. In a Japanese sentence, in which there are no spaces between words, each Japanese character may correspond to a token. Tokenizer 306 examines the local context of the word or character within the sentence or phrase, or the current character and its immediate neighbors. Tokenizer 306 may use a small set of tokenization rules 304. In one example of an English language sentence, tokenizer 306 may make a break at the following places with the corresponding effect:

--- space character (space, return, tab, End-of-Sentence (EOS));
apostrophe + space character ("Doris'"-> "Doris" "'");
apostrophe + "s" ("Peter's" -> "Peter" "'s");
apostrophe + "re" ("they're" -> "they" "'re");
apostrophe + "d" ("Peter'd" -> "Peter" "'d");
apostrophe + "ve" ("Peter've" -> "Peter" "'ve");
apostrophe + "ll" ("Peter'll" -> "Peter" "'ll");
period + EOS ("Peter likes fish." -> "Peter" "likes" "fish" ".");
question mark ("Does Peter like fish?" -> "does" "Peter" "like" "fish" "?");
exclamation mark ("Fish!" -> "fish" "!");
comma (except between numbers) ("apples, oranges and bananas" -> "apples" "," "oranges" "and" "bananas");
dollar sign ("$30" -> "$" "30");
percent sign ("30%" -> "30" "%");
plus sign ("+80" -> "+" "80");
minus sign (only when followed by a number) ("–3" -> "–" "3");
semicolon ("fruits; apples, oranges and bananas" -> "fruits" ";" "apples" "," "oranges" "and" "bananas");
colon (except between numbers).

---

In one embodiment, segmentation and POS engine 320 receives tokens 308 and performs one or more of its assigned functions, such as, for example, segmentation, POS tagging, and multiword processing. Each of the named functions is described in more detail below.

During segmentation, segmentation and POS engine 320 makes possible connections between tokens by consulting lexical dictionary 316 and lexical functions 314. In one embodiment, lexical dictionary 316 comprises lexical entries in the format of feature structures. Each lexical entry stored in lexical dictionary 316 may have a corresponding POS information. In alternate embodiments, a wide variety of other lexical information may be stored in lexical dictionary 316. In one embodiment, lexical dictionary 316 may also contain a multiword dictionary used in the multiword processing as described below. Alternatively, multiword information may be stored in a separate dictionary.

Lexical functions 314 represent lexical grammar rules 310. In one embodiment, lexical grammar rules 314 result from pre-compiling lexical grammar rules 310 using GPL compiler 312. In this embodiment, lexical functions related to tokens 308 may be selected from lexical functions 314. Alternatively, lexical grammar rules related to tokens 308 may be selected from lexical grammar rules 310 and compiled by GPL compiler 312 to generate lexical functions related to tokens 308.

Lexical grammar rules 310 may be written in GPL. In one embodiment, lexical grammar rules 310 comprise Japanese lexical grammar rules. In an alternate embodiment, lexical grammar rules 310 may comprise various grammar rules of any other language and may be represented by a wide variety of other programming languages or structures. The japanese grammar rules may include rules defining connectivity relation of tokens.

In one embodiment, GPL compiler 312 compiles rules selected from lexical grammar rules 310 to generate lexical functions 314. As described above, lexical functions 314 may include calls to feature structure library routines which allow flexibility in developing lexical grammar rules. This flexibility becomes especially important when complex and space consuming rules are involved, such as lexical connector rules defining connectivity relation of tokens.

After defining all possible connections of tokens 308, segmentation and POS engine 320 may perform POS tagging. Alternatively, POS tagging may be performed simultaneously with the segmentation process. In another embodiment, POS tagging may be performed without performing segmentation (for example, in word-based natural languages). Segmentation and POS engine 320 performs POS tagging by consulting lexical dictionary 316 and assigning all possible POS tags to each segmented word of the input sentence 302. In one embodiment, segmentation and POS engine 320 searches lexical dictionary 316 for every segmented word of input sentence 302. As described above, lexical dictionary 316 may comprise lexical entries for words in the format of feature structures. Once the segmented word is found, segmentation and POS engine 320 retrieves all corresponding POS tags contained within the feature structure of this word.

In one embodiment, multiword processing is also performed to define multiword expressions in the input sentence. Segmentation and POS engine 320 performs multiword processing by consulting a multiword dictionary which may be included in the lexical dictionary 316 or contained in a separate dictionary. The multiword processing is described in more detail below.

In one embodiment, segmentation and POS engine 320 creates a connection graph comprising a plurality of paths defined by all possible segmentations of input sentence 302 and/or various POS tags assigned to each segmented word in input sentence 302. Multiword expressions may also be reflected in the connection graph. The content of the connection graph and the process of its creation are explained below. Segmentation and POS engine 320 compares the paths in the connection graph. In one embodiment, the comparison is done using lexical cost file 318 which contains various lexical cost information. The information in lexical cost file 318 may include, for example, lexical costs, unigram costs, bigram costs and connector costs.

Lexical costs correspond to the probability of observing a certain word as a certain part of speech. For example, the probability of observing word "bank" as a noun may be higher than the probability of observing word "bank" as a verb. Unigram cost or POS costs correspond to the probability of observing a particular part of speech, regardless of what the particular word is or what the surrounding parts of speech are. For example, the probability of observing a noun within any sentence may be higher than the probability of observing a determiner. Bigram costs correspond to the probability of observing a sequence of two particular parts of speech together, regardless of what the words are. For example, the probability of observing a determiner followed by a noun may be higher than a probability of observing a noun followed by a determiner. Connector costs correspond to the probability of observing two particular words in adjacent positions. Consider a Japanese sentence, in which two different words, word 1 and word 2, may be created starting from a certain position depending on their lengths. Let's say that word 1 is created by combining six characters and word 2 is created by combining eight characters, which include the same six characters plus two characters immediately following the six characters. Word 3 in our example is a word which ends immediately before word 1 and word 2 start. In our example, the connector costs may reflect that the probability of observing word 3 in a position adjacent to word 2 may be higher than the probability of observing word 3 adjacent to word 1, or vice versa.

Lexical cost information may be stored in a database or it may be divided with one portion being stored along with lexical grammar rules 310 and another portion being stored with POS information in lexical dictionary 316. In alternate embodiments, a variety of means for storing the lexical cost information may be used.

Based on the costs assigned to each path, segmentation and POS engine 320 selects the best paths within the connection graph that have lower costs. The best paths are used to generate output graph 322 which is provided to syntactic analysis module 216 of FIG. 2a for further processing. Output graph 322 contains the information needed by syntactic analysis module 216 for making an accurate final interpretation of the input sentence. In addition, the operation of syntactic analysis module 216 is simplified because only pertinent information (i.e., lexical feature structures for best paths as opposed to all possible paths) is passed to syntactic analysis module 216. Thus, the present invention may provide an accurate response to an input sentence, without consuming unreasonable amount of memory and processing time.

Figure 4:
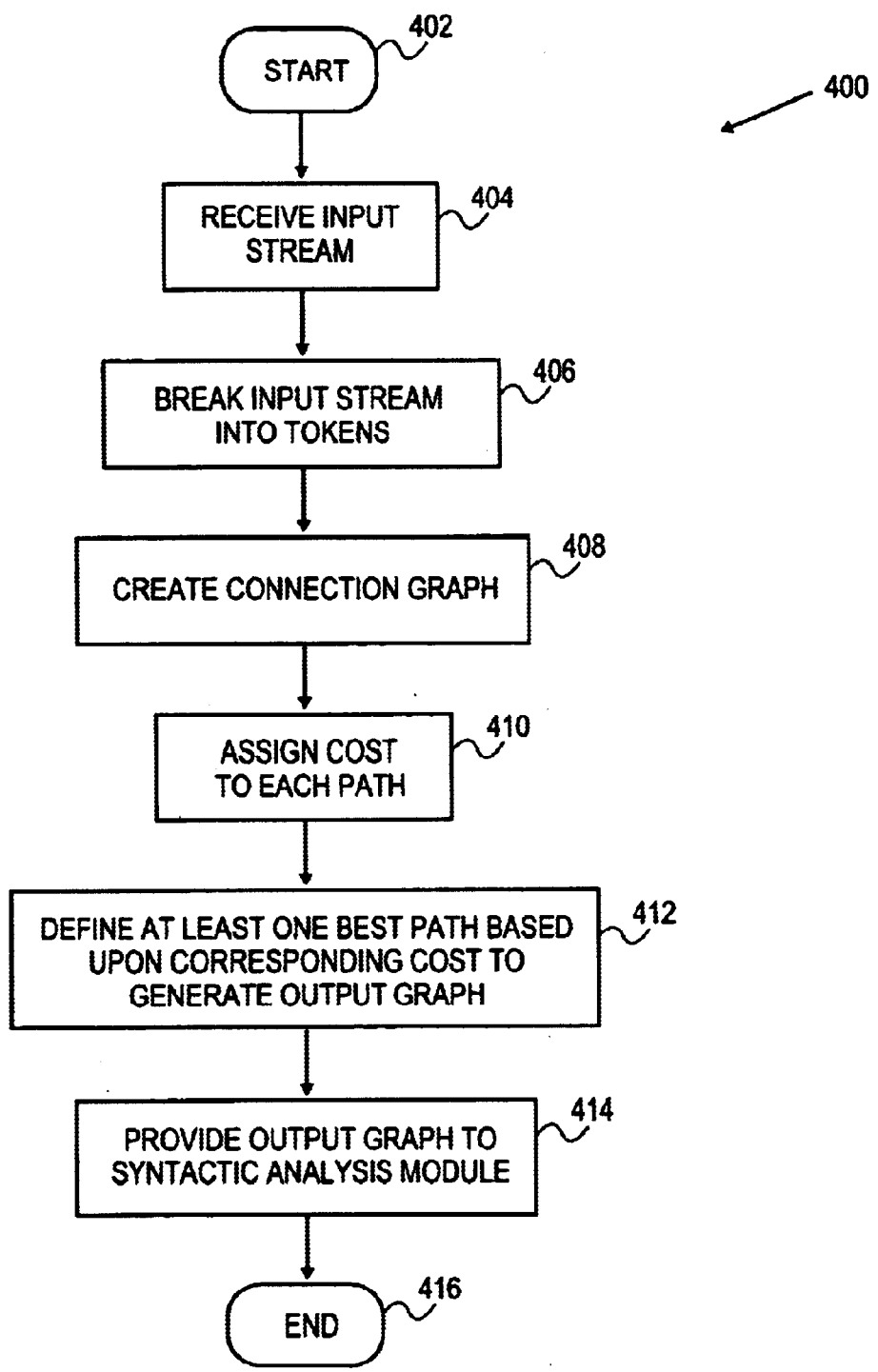
FIG. 4 is a flow diagram of one embodiment for reducing lexical ambiguity in a natural language translation system.

FIG. 4 is a flow diagram of one embodiment for reducing lexical ambiguity in a natural language translation system. Initially, at processing block 404, an input stream is passed to lexical ambiguity reduction module 300 of FIG. 3. The input stream may be, for example, a full sentence, a reduced sentence, a word, a number, a symbol, or a punctuation character. At processing block 406, the input stream is broken into tokens. In one embodiment, the input stream is broken into at least two tokens. The number of tokens varies depending upon the language, length and complexity of the input stream, and applicable tokenization rules 304, as described above.

At processing block 408, the tokens are used to create a connection graph. The connection graph may be created by finding all possible connections between tokens (i.e. performing segmentation of the input stream). The process of segmentation is described in more detail below. Regardless of whether the input stream requires segmentation, POS tagging and/or multiword processing may need to be performed. As described above, POS tagging involves finding all possible POS tags for each word in the input stream by consulting a lexical dictionary.

Multiword processing involves defining all possible multiword expressions in the input stream using a multiword dictionary. The multiword dictionary comprises multiword expressions ("multiwords") in the format of feature structures. Consider the words "White House" in the sentence "I want to visit the White House." Valid feature structures for the combination may include:

$$(\text{Feature Structure 4}) \quad \text{white} \mapsto \begin{bmatrix} \text{root: white} \\ \text{cat: adj} \end{bmatrix}$$

$$(\text{Feature Structure 5}) \quad \text{house} \mapsto \begin{bmatrix} \begin{bmatrix} \text{root: house} \\ \text{cat: noun} \end{bmatrix} \\ \text{OR} \\ \begin{bmatrix} \text{root: house} \\ \text{cat: verb} \end{bmatrix} \end{bmatrix}$$

An equally valid feature structure for the combination may be:

$$(\text{Feature Structure 6}) \quad \text{White House} \mapsto \begin{bmatrix} \text{root: White House} \\ \text{cat: proper noun} \end{bmatrix}$$

If Feature Structure 4 and Feature Structure 5 are found together in the multiword dictionary, then the combination "White House" is defined as a multiword and Feature Structure 6 is retrieved.

Referring again to processing block 408 of FIG. 4, the connection graph comprises a set of nodes and a set of arcs.

Figure 5A:
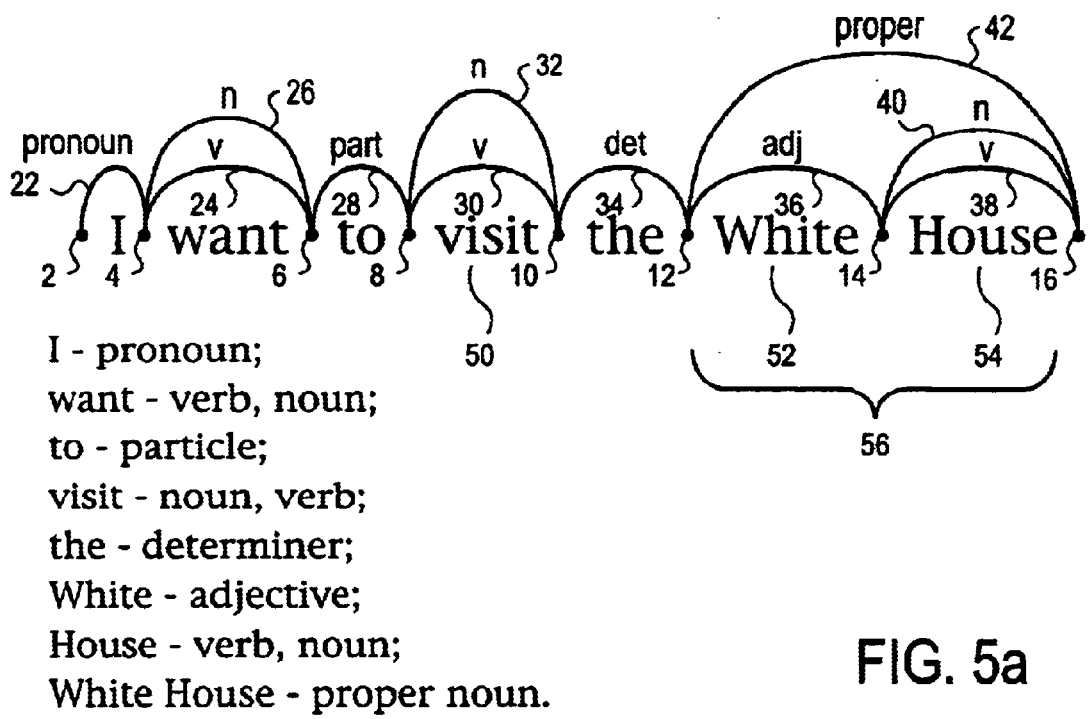
FIG. 5a illustrates an exemplary connection graph.

A node corresponds to a separator between two words. An arc corresponds to a token and connects two nodes. An arc may be labeled with a corresponding part of speech tag. An example of a connection graph is shown in FIG. 5a. After the connection graph with the plurality of paths is created, each of the plurality of paths is assigned a cost, as shown in processing block 410. Each arc comprising the path has a cost associated with it. When processing character-based languages, e.g. the Japanese language, each node may also have a cost associated with it. As described above, these costs may be obtained from lexical cost file 318 and may include, for example, lexical costs, unigram costs, bigram costs, connector costs. In one embodiment, the cost assigned to each path results from summing all costs defined for every arc and, if applicable, every node in this path. The process of calculating the cost for each path will be described in more detail below.

At processing block 412, at least one best path is selected from the plurality of paths based upon a corresponding cost. In one embodiment, costs of all possible paths are weighed and those with lower costs are selected to generate an output graph. The selection of paths is described in more detail below. At processing block 414, the output graph comprising the best paths is provided to syntactic analysis module 216 for further processing. In the examples described, selection of the best paths reduces lexical ambiguity in the input stream before the syntactic analysis module 216 begins its parsing operation, thereby simplifying the parsing process. In one embodiment, lexical ambiguity reduction module 210 provides syntactic analysis module 216 with all the information it may need for producing an accurate interpretation of the input stream.

Figure 5B:
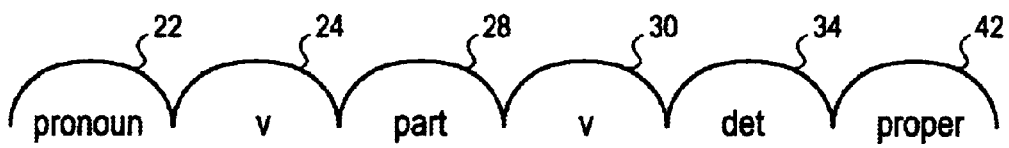
FIG. 5b illustrates an exemplary path in a connection graph.

FIG. 5a illustrates an exemplary connection graph for the input expression "I want to visit the White House." Specifically, each pair of nodes 2 through 16 are connected by arcs 22 through 42. Arcs 22 through 42 are labeled with corresponding part of speech tags. For example, the word "visit" 50 is separated by nodes 8 and 10. Because the word "visit" 50 may have at least two part of speech tags, such as, for example, a verb and a noun, nodes 8 and 10 are connected by at least two arcs. In the example, arc 30 corresponds to a verb ("v") and arc 32 corresponds to a noun ("n"). The word "House" 54 is separated by nodes 14 and 16 which are connected by arc 38, representing a verb tag, and arc 40, representing a noun tag. In addition, the word "House" 54 is a part of a multiword "White House" 56, which is a proper noun, as shown in Feature Structure 6. As a result, arc 42 is created connecting nodes 12 and 16 to represent the multiword expression with a POS tag of a proper noun. Possible combinations of arcs and nodes define a plurality of paths in the connection graph. The number of possible paths may vary depending on how many arcs represent each word in the input stream. If each word in the input stream has only one arc representing it, then the connection graph comprises only one path. Typically, however, more than one path is defined in the connection graph. In the example, twelve different paths may be defined in the connection graph based on all possible combinations of the arcs and nodes. FIG. 5b illustrates an exemplary path of one of the twelve possible paths of FIG. 5a. Referring to FIG. 5b, the exemplary path consists of the combination of arcs 22, 24, 28, 30, 34 and 42 and corresponding nodes.

Figure 6:
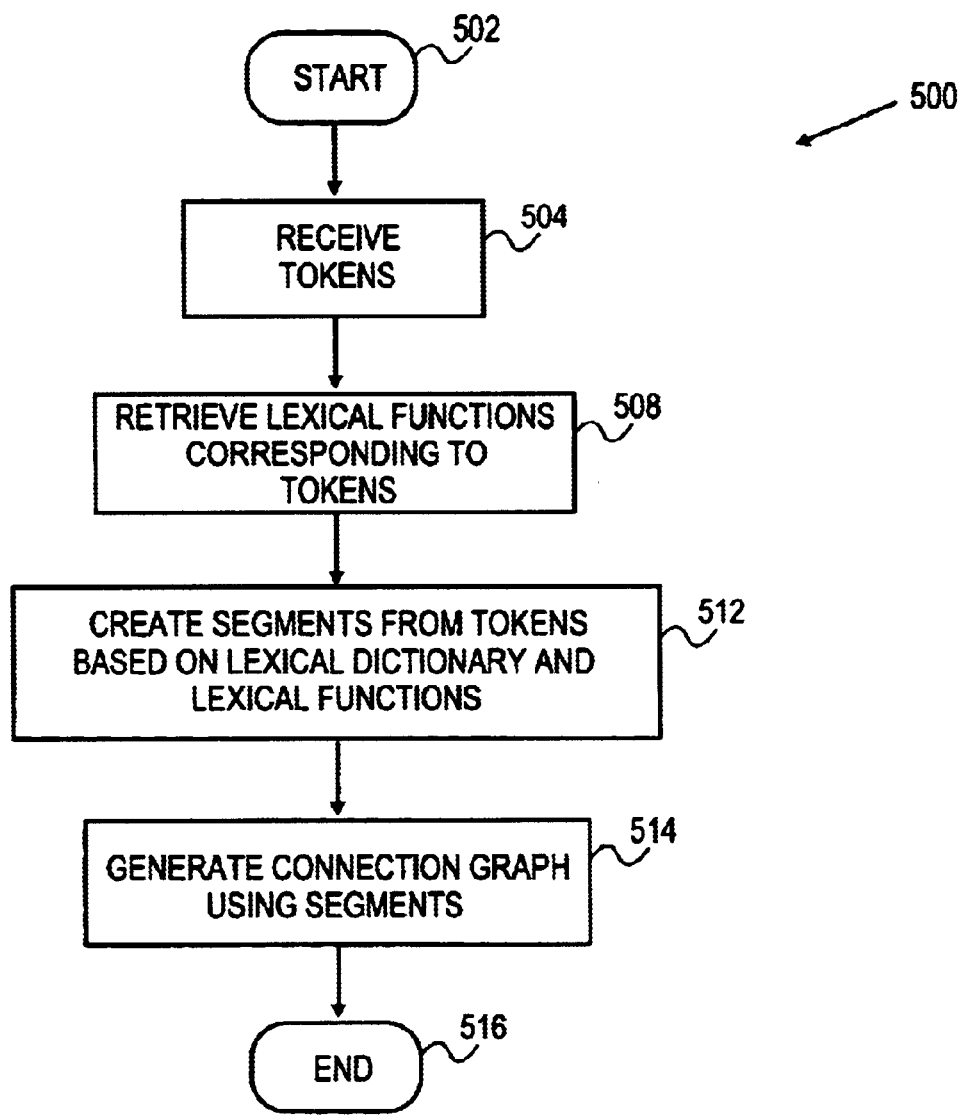
FIG. 6 is a flow diagram of one embodiment for segmentation of an input stream.

FIG. 6 is a flow diagram of one embodiment for segmenting an input stream. The segmentation process is used in character-based languages, e.g. the Japanese language, which do not have separators such as spaces between words. A task of the segmentation process is to recognize all the possible words (or segments) in the given input stream and find possible connections between adjacent words. Initially at processing block 504, tokens are received. In one embodiment, at least two tokens are received. At processing block 508, lexical functions may be selected from a collection of lexical functions 314. In one embodiment, lexical functions 314 result from pre-compiling lexical grammar rules 310 using a GPL compiler. Lexical grammar rules 310 may be written in GPL and may define connectivity relation of tokens. Lexical functions 314 may call feature structure library routines. As described above, the output of GPL compiler 312 may be in the form of directly executable code or may be in the form of standard computer programming language statements. Either approach provides a flexible method to develop grammar rules which becomes especially important for rules defining connectivity relation of tokens in character-based languages due to manipulation of large amount of data involved in presentation of these rules.

At processing block 512, segments are created from the tokens based upon the lexical functions and lexical dictionary. The created segments define all possible segmentations of the input stream. The creation of the segments may include finding various combinations of the tokens and then determining all possible connections between these various combinations. That is, the lexical information retrieved from lexical dictionary 316 may be used to define which tokens may be combined. Based upon all possible combinations, a number of lexical items (segments) may be created, in which every lexical item results from combining one or more tokens of the input stream. Then, lexical dictionary 316 and the lexical functions may be used to determine which adjacent segments may be connected. The segments that have valid connections define all possible segmentations of the input stream.

At processing block 514, a connection graph is generated from these segments. The connection graph represents all possible segmentations of the input stream and is subsequently processed by segmentation and POS engine 320 to generate an output graph. In one embodiment, the time consuming segmentation process may be performed efficiently, thereby improving the overall performance of the translation system.

Figure 7:
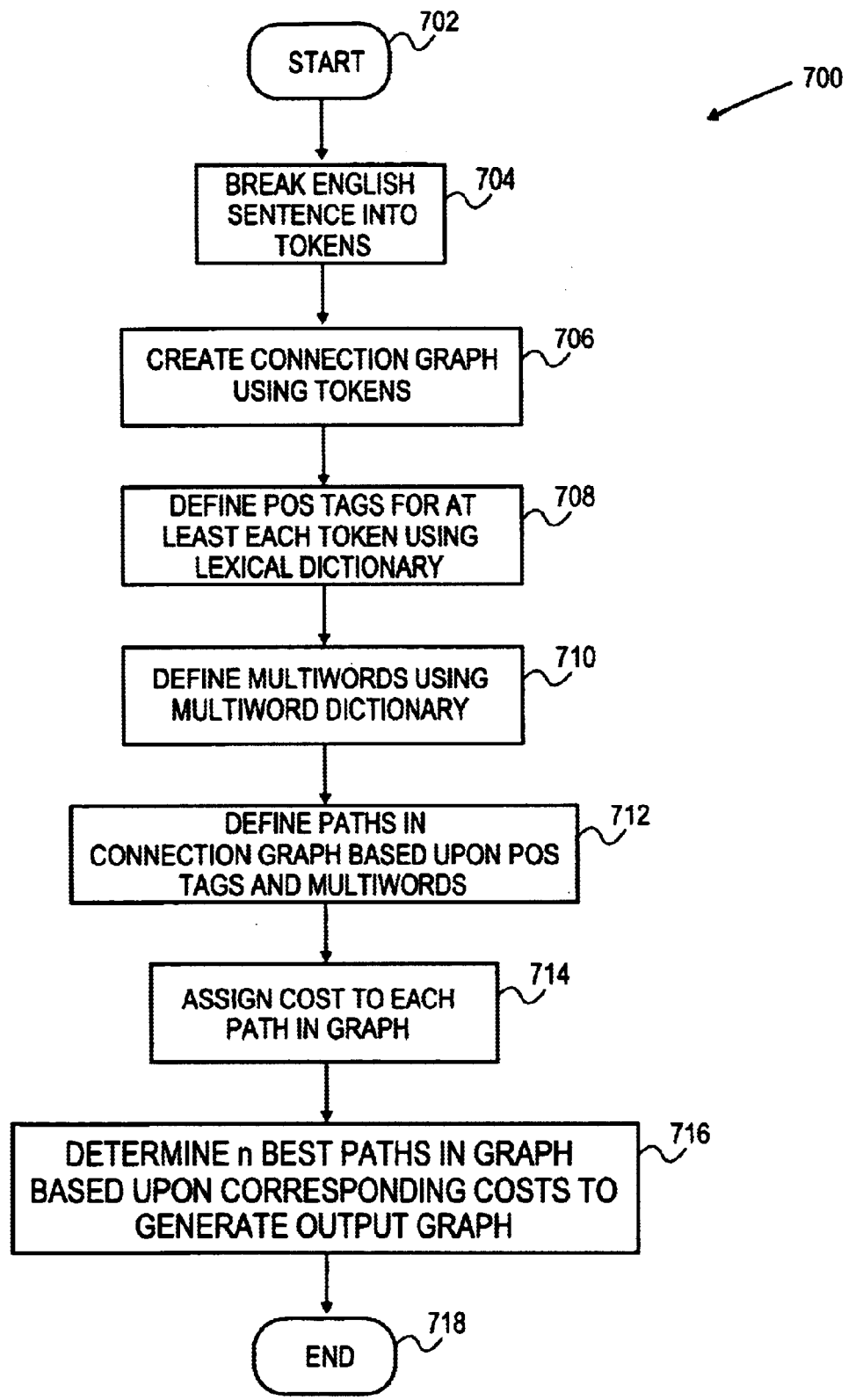
FIG. 7 is a flow diagram of one embodiment for reducing lexical ambiguity in an input English expression.

FIG. 7 is a flow diagram of one embodiment for reducing lexical ambiguity in an input English sentence. At processing block 704, tokenization of an input English sentence is performed by breaking the input English sentence into tokens. The number of tokens resulting from tokenizing an English sentence varies depending on the lengths and complexity of the sentence. At processing block 706, a connection graph is created using the tokens. As described above, the connection graph comprises a set of nodes and a set of arcs.

At processing block 708, all possible POS tags are defined for each word in the sentence by consulting lexical dictionary 316. In one embodiment, each word in the sentence comprises at least one token. When more than one POS tag is found in the lexical dictionary for a word, an arc is added in the connection graph to represent every additional POS tag found. Every arc is labeled with a corresponding POS tag. The FIG. 5a example shows all the arcs defined for every word in the input sentence "I want to visit the White House." The elements of the connection graph are described in more details above.

Referring to FIG. 7, at processing block 710, multiword expressions are defined by consulting a multiword dictionary. As described above, an arc is added to define each multiword in the sentence. Based upon all possible POS tags and multiwords in the sentence, a plurality of paths is defined in the connection graph. Each path represents a combination of arcs and nodes in the connection graph. In the example shown in FIG. 5a, twelve different paths may be defined in the connection graph based on all possible combinations of the arcs and nodes. The FIG. 5b example illustrates one of the twelve possible paths which consists of the combination of arcs 22, 24, 28, 30, 34 and 42 and corresponding nodes.

Referring to FIG. 7, at processing block 714, each path in the connection graph is assigned a cost. This cost is a total of overall costs calculated for all the arcs contained in the path. In one embodiment, the overall cost calculated for all the arcs in the path includes a lexical cost, a POS (or unigram cost) and a bigram cost. In the example shown in FIG. 5a, the lexical cost assigned to arc 24 may be lower than the cost assigned to arc 26 because the word "want" may be used more often as a verb than as a noun. The unigram cost or POS cost corresponds to the probability of observing this particular part of speech, regardless of what the word is or what the surrounding parts of speech are. For example, the unigram cost assigned to arc 24 may be higher than the unigram cost assigned to arc 26 because verbs in general may be considered to be used more often than nouns. The bigram cost corresponds to the probability of observing a sequence of two particular parts of speech, regardless of what the words are. The bigram cost is assigned to each pair of connected arcs. For example, the bigram cost assigned to the combination of arcs 22 and 24 may be lower than the bigram cost assigned to the combination of arcs 22 and 26 because the sequence of a pronoun and a verb may be more probable than the sequence of a pronoun and a noun. Thus, the total cost assigned to each path includes lexical costs assigned to each arc in the path, unigram costs assigned to each arc in the graph and bigram costs assigned to each pair of arcs in the graph. In one embodiment, when a path comprises an arc defining a multiword expression (e.g., arc 42 in FIG. 5a or 5b), the cost for this arc is derived from the multiword entry in the multiword dictionary.

Referring to FIG. 7, at processing block 716, the n best paths are selected from all the paths in the connection graph. The selection is based upon a cost assigned to each path. The number ("n") of best paths selected may be predefined based upon a variety of factors, such as, for example, a desired level of accuracy, the complexity of information being processed, or time constraints associated with the process. In an alternate embodiment, the number of best paths may be determined by segmentation and POS engine 320 during operation based upon various factors. In another embodiment, the number of best paths may be varied depending upon a certain percentage defined to limit costs of selected best paths. For example, this percentage may be set to 10%. If the lowest among the costs assigned to paths in the connection graph equals to 20, then only the paths with costs not exceeding the lowest costs for more than ten percent may be selected as best paths. For example, if path 1 has a cost of 10, path 2 has a cost of 11.8, path 3 has a cost of 12.2, and path 4 has a cost of 14, only paths 1 and 2 are selected as best paths because costs of paths 3 and 4 exceed the cost of path 1 for more than 10%. In alternate embodiments, a variety of methods for determining the number of best paths may be used. The selected n best paths are then used to generate an output graph 718 as described above.

Figure 8:
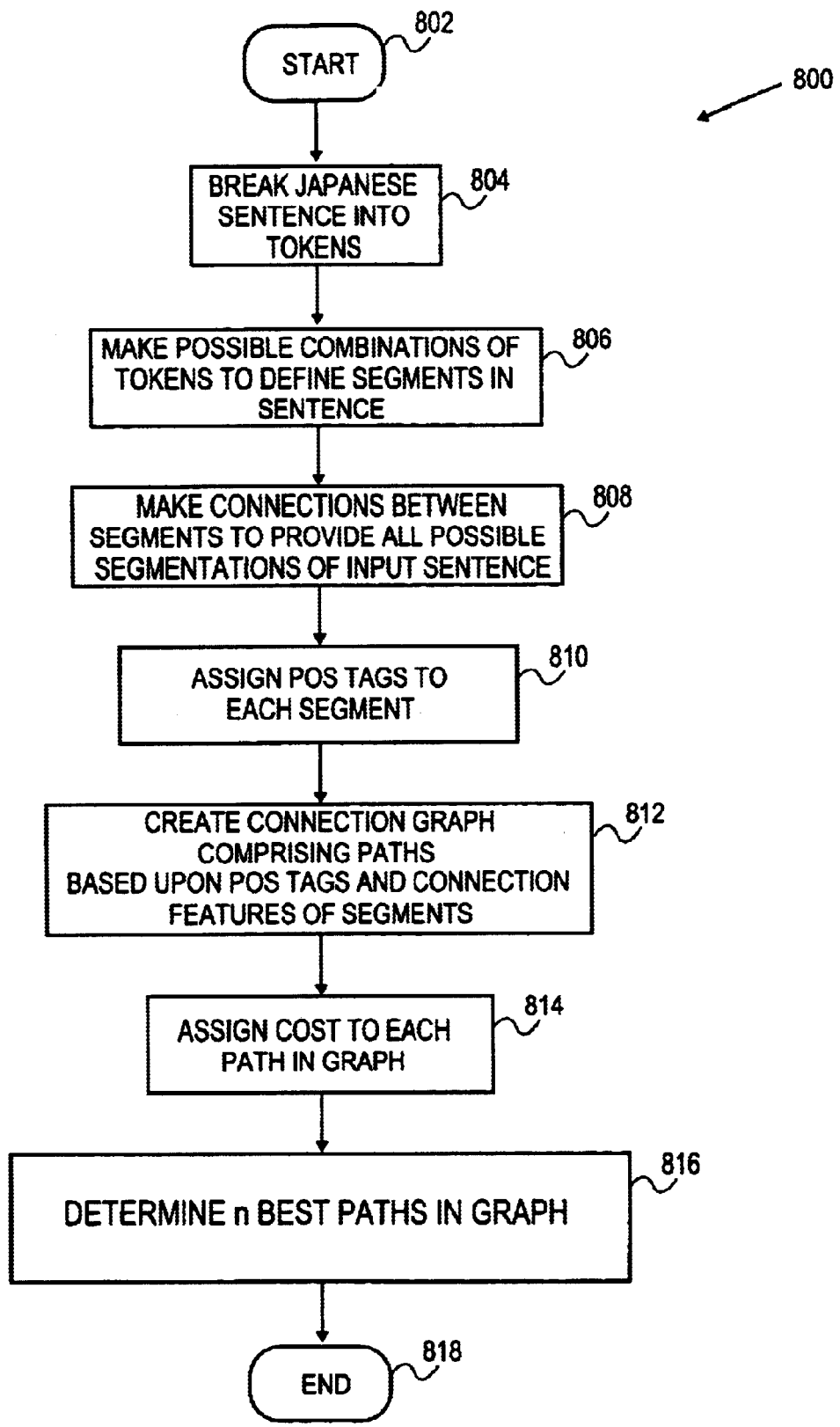
FIG. 8 is a flow diagram of one embodiment for reducing lexical ambiguity in an input Japanese expression.
Figure 9:
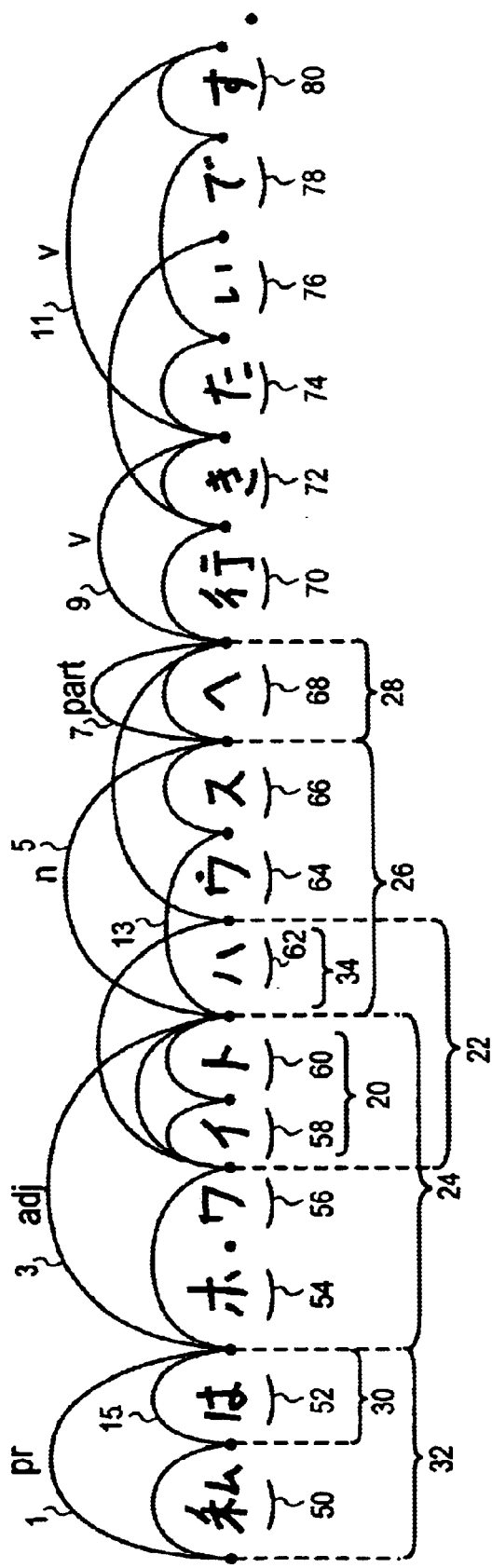
FIG. 9 illustrates an exemplary connection of tokens in an input Japanese sentence.

FIG. 8 is a flow diagram of one embodiment for reducing lexical ambiguity in an input Japanese sentence. At processing block 804, tokenization of an input Japanese sentence is performed by breaking the input Japanese sentence into tokens. Because a typical Japanese sentence does not have separators such as spaces between words, each Japanese character in the sentence may correspond to a token. At processing block 806, the tokens are combined in all possible combinations to define a variety of lexical entries (segments) in the sentence using lexical dictionary 316. FIG. 9 illustrates an exemplary connection of tokens in an input Japanese sentence. Referring to FIG. 9, tokens 50 through 80 are combined in various ways. Combinations of tokens are made to match any entry in lexical dictionary 316. For example, token 50 by itself may have a matching lexical entry in lexical dictionary 316, or a combination of tokens 50 and 52 may have a matching lexical entry in lexical dictionary 316. All combinations that have matching entries in lexical dictionary 316 are analyzed to define all the possible lexical entries (segments) in the input sentence. For example, the combination of tokens 58 and 60 may define segment 20. In addition, the combination of the same tokens 58 and 60 along with a token 62 may result in segment 22. Furthermore, the combination of tokens 58 and 60 may be a part of segment 24.

Referring to FIG. 8, at processing block 808, the variety of segments are connected using lexical dictionary 316 and lexical functions to define possible segmentations of the input sentence. As described above, in one embodiment, the lexical functions are associated with the segments being processed and are selected from the entire collection of lexical functions 314. Lexical functions 314 result from compiling lexical grammar rules using GPL compiler 312. Selected lexical functions define connectivity relation between lexical feature structures of the input sentence. In one embodiment, based upon lexical functions 314 and lexical dictionary 316, all possible connections for each lexical feature structure may be defined using features LEX-TO and LEX-FROM assigned to the lexical feature structures of the input sentence. For every lexical feature structure, features LEX-TO and LEX-FROM may define all possible parts of speech that can be connected to this segment. That is, the feature LEX-FROM may define all parts of speech that may precede this segment and the feature LEX-TO may define all parts of speech that can immediately follow this segment. If any value in LEX-TO and LEX-FROM features of adjacent segments matches, then these two segments may be connected. As shown in FIG. 9, lexical feature structure 26 defined by arc 5 has a value "noun-part" in its LEX-TO feature. The same value is contained in a LEX-FROM feature of lexical feature structure 28 defined by arc 7. Thus, a valid connection can be made between these two adjacent segments. Each segment may be connected to more than one preceding segment and to more than one following segment. For example, segment 24 may be connected to at least two preceding segments (e.g., segments 30 and 32) if any value in its LEX-FROM feature matches with any value in a LEX-TO feature of every preceding segment. In addition, segment 24 may be connected to at least two following segments (e.g., segments 26 and 34) if any value in its LEX-TO feature matches with any value in a LEX-FROM feature of every following segment. In one embodiment, segments that do not have either preceding or following connections are ignored. The rest of the segments may be used to define all possible segmentations of the input sentence.

Referring to FIG. 8, at processing block 810, each segment is assigned all POS tags found for this lexical entry in lexical dictionary 316. FIG. 9 shows sample POS tags assigned to arcs 1 trough 11.

Referring to FIG. 8, at processing block 812, the segments and corresponding POS tags may be used to create a connection graph. In one embodiment, the process of creating a connection graph for a Japanese sentence may be the same as the process of creating a connection graph for an English sentence. As described above, the connection graph comprises a set of nodes and a set of arcs. Each arc corresponds to a POS tag of a segment. Various combinations of arcs and nodes define a plurality of paths in the connection graph.

At processing block 814, each path is assigned a cost. As described above, this cost is a total of all costs calculated for every arc and node contained in the path. In a Japanese sentence, the cost calculated for every arc in the path may include a lexical cost and a POS (or unigram) cost. In addition, the segmentation process may involve a connector cost which is assigned to each node in the path. The connector cost corresponds to the probability of observing two types of words in adjacent positions. That is, each of all possible connections made between adjacent segments may carry a connector cost associated with this particular connection. Thus, in one embodiment, the cost assigned to each path may include lexical costs assigned to each arc in the paths, unigram costs assigned to each arc in the graph and connector costs assigned to each node in the graph. In alternate embodiments, any other way of calculating a cost for a path may be used.

At processing block 816, n best paths are selected from all the paths within the connection graph. In one embodiment, the selection is based upon a cost assigned to each path. The number of best paths is determined as described above. The selected n best paths are used to generate an output graph which is passed to syntactic analysis module 216.

A method and system for reducing lexical ambiguity in an input stream have been described. The method breaks the input stream into tokens and creates a connection graph using the tokens. If needed, the method may perform segmentation of the input stream, POS tagging or multiword processing. Results received in any of the above processes are used to define a plurality of paths in the connection graph. The method assigns a cost to each of the plurality of paths. Based upon assigned costs, at least one best path is selected from the plurality of paths. The method uses the at least one best path to generate an output graph. The output graph is passed to a syntactic analysis module to reduce lexical ambiguity. With the present invention, an efficient way of reducing lexical ambiguity is provided which produces an accurate interpretation of the input stream without unreasonably burdening the operation of the syntactic analysis module.

Several variations in the implementation of the method for reducing lexical ambiguity have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method for reducing lexical ambiguity in an input stream, comprising:

breaking the input stream into at least two tokens;

compiling lexical grammar rules to generate lexical functions;

creating a plurality of segments from the at least two tokens based upon lexical information and the lexical functions, defining a plurality of paths using the plurality of segments;

assigning a cost to each of the plurality of paths;

defining at least one best path based upon a corresponding cost to generate an output graph; and providing the output graph to a syntactic analysis module for subsequent syntactic analysis of the input stream to reduce lexical ambiguity.

2. The method of claim 1 wherein a number of the at least one best path is either predefined or determined programmatically.

3. The method of claim 1 wherein creating a connection graph using the at least two tokens comprises assigning at least one part of speech tag to at least one of the at least two tokens using lexical information.

4. The method of claim 1 wherein creating a connection graph using the at least two tokens comprises recognizing a multiword expression in the input stream using multiword information.

5. The method of claim 1 wherein the connection graph comprises a set of nodes and a set of arcs.

6. The method of claim 5 wherein each of the plurality of paths comprises a combination of nodes and arcs.

7. The method of claim 1 wherein the cost comprises lexical cost, unigram cost, bigram cost and connector cost.

8. An apparatus for reducing lexical ambiguity in an input stream, comprising:

means for breaking the input stream into at least two tokens;

means for compiling lexical grammar rules to generate lexical functions;

means for creating a plurality of segments from the at least two tokens based upon lexical information and the lexical functions, means for defining a plurality of paths using the plurality of segments;

means for assigning a cost to each of the plurality of paths;

means for defining at least one best path based upon a corresponding cost to generate an output graph; and means for providing the output graph to a syntactic analysis module for subsequent syntactic analysis of the input stream to reduce lexical ambiguity.

9. The apparatus of claim 8 wherein a number of the at least one best path is either predefined or determined programmatically.

10. The apparatus of claim 8 further comprising means for assigning at least one part of speech tag to at least one of the at least two tokens using lexical information.

11. The apparatus of claim 8 further comprising means for recognizing a multiword expression in the input stream using multiword information.

12. The apparatus of claim 8 wherein the connection graph comprises a set of nodes and a set of arcs.

13. The apparatus claim 12 wherein each of the plurality of paths comprises a combination of nodes and arcs.

14. The apparatus of claim 8 wherein the cost comprises lexical cost, unigram cost, bigram cost and connector cost.

15. An apparatus for reducing lexical ambiguity in an input stream, comprising:

a tokenizer to break the input stream into at least two tokens;

a grammar programming language (GPL) compiler to compile lexical grammar rules to generate lexical functions;

a segmentation engine to create a plurality of segments from the at least two tokens based upon lexical information and the lexical functions;

a path designator to define a plurality of paths using the plurality of segments;

a cost assignor to assign a cost to each of the plurality of paths;

a path calculator to define at least one best path based upon a corresponding cost to generate an output graph; and a graph provider to provide the output graph to a syntactic analysis module for subsequent syntactic analysis of the input stream to reduce lexical ambiguity.

16. The apparatus of claim 15 wherein a number of the at least one best path is either predefined or determined programmatically.

17. The apparatus of claim 15 wherein the token connector comprises a part of speech tagger for assigning at least one part of speech tag to at least one of the at least two tokens using lexical information.

18. The apparatus of claim 15 wherein the token connector comprises a multiword recognizer for recognizing a multiword expression in the input stream using multiword information.

19. The apparatus of claim 15 wherein the connection graph comprises a set of nodes and a set of arcs.

20. The apparatus of claim 15 wherein each of the plurality of paths comprises a combination of nodes and arcs.

21. The apparatus of claim 15 wherein the cost comprises lexical cost, unigram cost, bigram cost and connector cost.

22. A system for reducing lexical ambiguity, comprising:

a processor;

an input coupled to the processor, the input capable of receiving an input stream, the processor configured to break the input stream into at least two tokens, compile lexical grammar rules to generate lexical functions, create a plurality of segments from the at least two tokens based upon lexical information and the lexical functions, define a plurality of paths using the plurality of segments, assign a cost to each of the plurality of paths, and define at least one best path based upon a corresponding cost to generate an output graph; and an output coupled to the processor, the output capable of providing the output graph to a syntactic analysis module for subsequent syntactic analysis of the input stream to reduce lexical ambiguity.

23. A computer readable medium comprising instructions, which when executed on a processor, perform method for reducing lexical ambiguity in an input stream, comprising:

breaking an input stream into at least two tokens;

compiling lexical grammar rules to generate lexical functions;

creating a plurality of segments from the at least two tokens based upon lexical information and the lexical functions;

defining a plurality of paths using the plurality of segments;

assigning a cost to each of the plurality of paths;

defining at least one best path based upon a corresponding cost to generate an output graph; and providing the output graph to a syntactic analysis module for subsequent syntactic analysis of the input stream to reduce lexical ambiguity.

24. The computer readable medium of claim 23 wherein creating a connection graph further comprises providing segmentation of the input stream using lexical information and lexical functions.

25. The computer readable medium of claim 23 wherein creating a connection graph further comprises assigning at least one part of speech tag to at least one of the at least two tokens using lexical information.

26. The computer readable medium of claim 23 wherein creating a connection graph further comprises recognizing a multiword expression in the input stream using lexical information.

27. The computer readable medium of claim 23 wherein a number of the at least one best path is either predefined or determined programmatically.

* * * * *